3,305,608
PHENOLIC PHOSPHITES
Charles F. Baranauckas and Irving Gordon, Niagara Falls, N.Y., assignors to Hooker Chemical Corporation, Niagara Falls, N.Y., a corporation of New York
No Drawing. Filed Oct. 8, 1962, Ser. No. 229,180
9 Claims. (Cl. 260—921)

This invention relates to novel phosphites and the preparation thereof. More particularly, this invention relates to novel phenolic phosphites and to vinyl, vinylidene and other resins stabilized with said phosphites.

It is an object of the present invention to prepare new phenolic phosphites.

It is another object of the invention to prepare resinous compositions containing phenolic phosphites.

A still further object of the invention is the preparation of new phenolic phosphites which are amenable to dry blending with resins and act as stabilizers.

Still further objects and the applications of the present invention will become apparent from the detailed description given hereinafter.

These objects are accomplished by the preparation of novel phenolic phosphites. The novel phosphites of this invention may be prepared by reacting a triorganophosphite, a polyol and an aromatic material having between two and six phenolic hydroxy groups, at a temperature between 60° C. and 180° C., said reactants being present in a reaction zone in proportions of from about eight to twelve moles triorganophosphite, four to six moles polyol, and one and a half to four moles aromatic material with the ratio of polyol to the aromatic material being about 1.5:1 to 2.5:1, stripping off the by-products and recovering the phenolic phosphite.

The reaction according to this invention may be carried out in the atmosphere, however, it is preferred to carry it out under insert conditions, i.e., where the system is purged with nitrogen gas, in order to prevent the production of any impure product and to raise the yield of pure material.

The preferred product of this invention is prepared by reacting triphenyl phosphite, pentaerythritol and 4,4'-isopropylidenediphenol in the preferred proportions. The preferred amounts of such reactants used in the invention are about ten moles of triorganophosphite, about six moles of polyol, and about three moles of the aromatic material, the ratio of polyol to aromatic material being between 1.5:1 to 2.5:1, but such amounts may be adjusted accordingly when polyols and aromatic materials of different hydroxy contents are employed. For purposes of convenience, the preferred reaction product has been named phenolphite and is so referred to hereinafter.

Some products of the invention are those (1) prepared by reacting tributyl phosphite, trimethylol propane, and 4,4'-isopropylidenediphenol, (2) prepared by reacting triphenylphosphite, pentaerythritol and 4,4'-dihydroxydiphenyl sulfide, and (3) the reaction product of triphenyl phosphite, pentaerythritol and a condensation product of a phenolic formaldehyde condensation reaction.

Although the proportions specified are preferred, acceptable products may also be made when the proportion of reactants are between eight to twelve moles of the triorganophosphite; four to six moles of the polyol; and 1.5 to four moles of the aromatic material with the ratio of the polyol to the aromatic material being from 1.5:1 to 2.5:1, but such amounts may be adjusted accordingly when polyols and aromatic materials of different hydroxy contents are employed.

The reaction of this invention is preferably carried out in a temperature range of from about sixty degrees centigrade to about one hundred and twenty-five degrees centigrade. Any by-products produced during the reaction are effectively stripped from the system at a sufficient temperature and pressure of from about one hundred degrees centigrade to about one hundred and eighty degrees centigrade, under pressure of from five to fifty millimeters of mercury absolute. It is preferred to heat the reactants gradually to between about sixty and eighty degrees centigrade until the mixture becomes fluid, then raise the temperature to between about one hundred and one hundred and fifty degrees centigrade, preferably to about one hundred and twenty-five degrees centigrade. The reaction is deemed complete when no more phenol or alcoholic by-product can be stripped from the reaction mixture.

It is not usually necessary to employ a catalyst, although it is preferred to utilize a basic catalyst soluble in the reaction medium, particularly, when lower temperatures, such as 100 degrees centigrade are employed. Typical catalysts which may be employed are sodium phenates; trialkylamines, e.g., triethylamine, pyridine; sodium hydride; an alkali metal alkoxide and sodium hydroxide. When a catalyst is employed, it is preferably used in a small amount, e.g., one-tenth mole per mole of triphenylphosphite.

It is to be understood that the processes and products of this invention are not limited to those involving the preferred reactants. Although triphenyl phosphite is the preferred triorgano phosphite reactant, other triorganophosphites such as the various chloro-, bromo-, and alkyl (of 1 to 16 carbon atoms) phenyl phosphites are also useful. Among these are tri-4-chlorophenylphosphite; tri-2-chlorophenylphosphite; tri-3-chlorophenylphosphite; tri-2-methylphenylphosphite; tri-3-methylphenylphosphite; tri-4 - methylphenylphosphite; and trimethylphenylphosphite made by using a commercial meta and paracresol mixture as the starting material; tri-2-bromophenylphosphite; tri - 4-tert-butylphenylphosphite; tri - 2 - tert-butylphenyl phosphite; tri-4-n-butylphenylphosphite; tri-4-n-octylphenylphosphite; tributyl phosphite, tri-2-cyclohexylphenylphosphite; and 2,4-dimethylphenylphosphite, tributyl phosphite, triethyl phosphite, tripentyl phosphite, and useful mixtures thereof.

Although 4,4'-isopropylidenediphenol is a preferred reactant, other aromatics, and useful mixtures thereof, having between two and six phenolic hydroxyl groups may be used as a reactant in the process in the suitable proportions previously mentioned, either alone or in mixture. Among these compounds and materials are, for example, 4,4'-sec-butylidenediphenol, 4,4'-methylidenediphenol, 4,4'-hydroxydiphenyl sulfide; 2,4-methylidenediphenol; 2,2'-methylidenediphenol; phenolformaldehyde condensation products; 2,4-ethylidenediphenol; 4,4'-propylidenediphenol; 2,2' - propylidenediphenol; 2,4 - propylidenediphenol; 2,4'-3-pentylidenediphenol; 4,4'-, 2,2'-, or 2,4-hexylidenediphenol; 4,4'-, 2,2'- or 2,4-diphenylmethylidenediphenol; compounds with the following general formulae may also be used in the practice of the invention:

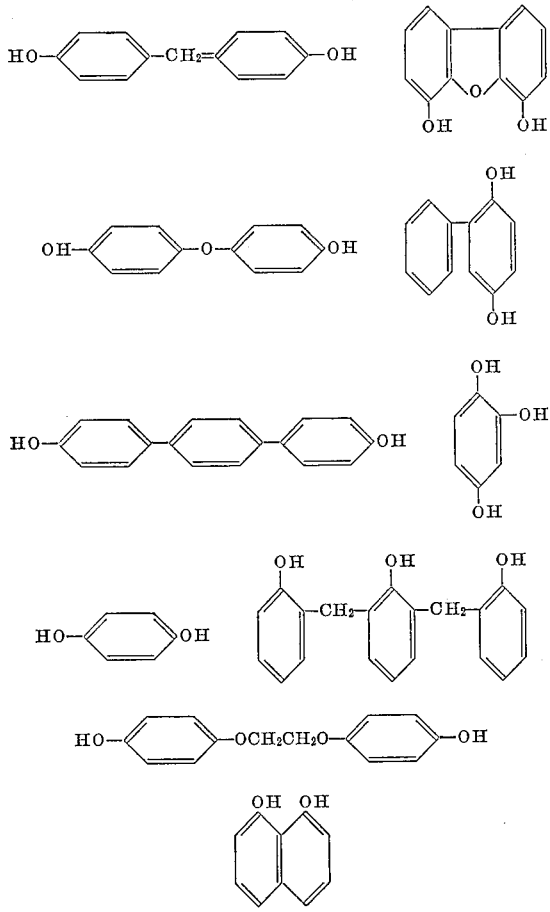

Although pentaerythritol is the preferred polyol of the invention, other polyols may be used as a reactant in the preparation previously mentioned, for example, dipentaerythritol, pentaerythritol dichlorohydrin, ethylene glycol, propylene glycol, trimethylene glycol, alpha butylene glycol, beta butylene glycol, 1,3-butanediol, tetramethylene glycol, isobutylene glycol, 1,5-pentanediol, 3-methyl-1,3-butanediol, pinacol, 2-methyl-2,4-pentanediol, 1,12-octadecanediol (Diolin), diethylene glycol, triethylene glycol, dipropylene glycol, 2,2-dimethyl-1,3-butanediol, 2-ethyl-1,3-hexanediol, hexylene glycol, 1,2,6-hexanetriol, 2-methyl-2-ethyl-1,3-propanediol 1,3 - dihydroxy-2,2,4,4-tetramethyl-1,3-cyclobutane dicarbonitrile, neopentyl glycol, trimethylol propane, trimethylol ethane, trishydroxymethyl phosphine, the bromide or chloride derivative of tetrakishydroxymethyl phosphonium, trishydroxymethyl phosphine oxide, bishydroxymethyl phosphinic acid, trishydroxymethyl phosphine acetate, methylene glycol, glycerin, decamethylene glycol, 2,3-butanediol (symmetrical dimethyl glycol), 1,2-propanediol-2-methyl (unsymmetrical glycol), dipropylene glycol, 1,2-ethanedithiol, 1,5-hexadiene-3,4-diol, 2,3-pentanediol, 1,4-pentanediol and useful mixtures thereof.

The proportions of reactants used in the process of this invention are dependent on the number of active hydrogens required to form the phenolic or alcoholic by-products with the triorgano phosphite used. As stated previously, it has been found that the preferred proportions of reactants employed to prepare the preferred phenolphite of the invention are about ten moles of triphenylphosphite, about six moles of pentaerythritol and about three moles of 4,4'-isopropylenediphenol.

Phenolphite prepared by the preferred process of the invention may be characterized by the following properties.

Empirical formula $(C_{75}H_{90}O_{30}P_{10})_x$, wherein $x$ is an integer from 1 to 10;

Melting point: 93–96 degrees centigrade as ascertained by an electro-mercury melting point technique;

Phosphorus analysis: 16%;

$n_D^{100°\ C.}$: 1.558;

Appearance: white crystalline solid;

Vapor base osmometer molecular weight: 758 in monochlorobenzene, 1,070 in tetrahydropropane, 1,090 in methylethyl ketone.

The electro-mercury melting point of phenolphite was taken by adding a sample of phenolphite into a 15 x 125 mm. test tube containing a thermometer. Mercury was then added to cover the crystals. Two electrodes were placed in the test tube in such a position that there was a completed electrical circuit which maintained lighted an electric bulb. An oil bath was used to heat the test tube. When the melting point of the composition was reached there was a break in the electrical circuit, at which time a temperature reading was taken.

Phenolphite prepared by the preferred process of this invention and as characterized above has been found to be relatively non-hygroscopic as illustrated in Table I, whereas phosphite products which are known in the art as vinyl and vinylidene resin stabilizers have hygroscopic tendencies.

TABLE I.—MOISTURE PICKUP BY PHENOLPHITE

| Exposure time: | Percent wt. pickup |
|---|---|
| 4 hrs. | 0 |
| 12 hrs. | 0 |
| 3 days | 0.9 |

Further, phenolphite is a white crystalline product which is readily micropulverized, thus making it amenable to dry blending with vinyl and vinylidene resins, whereas, products in similar use in the art are either liquid or waxes and are not capable of dry blending.

In addittion to the utilities set forth and exemplified herein, the phenol phosphites of this invention are capable of acting as antioxidants in G.R.S. type rubbers and as stabilizers in other types of plastics such as polyethylene, polyvinyl chloride, vinylidene resins, polypropylene, copolymers of polypropylene, polyethylene, and in general all polycarbamates and polyacrylonitrile.

Examples of the products of this invention and the preparation and utility thereof are as follows (all parts are by weight unless otherwise specified): It should be understood, however, that the specific examples, while indicating preferred embodiments of the invention, are given by way of illustration only, since various changes and modifications within the spirit and scope of the invention will become apparent to those skilled in the art from the following detailed examples.

*Example 1*

Triphenyl phosphite (2,325 parts, 7.5 moles), pentaerythritol (613 parts, 4.5 moles), and 4,4'-isopropylidenediphenol (514 parts, 2.25 moles) were charged to the resin flask and gradually heated to 60–80 degrees centigrade, until the mixture became fluid. The mixture was kept under a nitrogen atmosphere and stirred until it became homogeneous. At this point a sodium catalyst (0.75 part) was added to the mixture. The nitrogen introduction was continued and the temperature was raised to 125 degrees centigrade. The reaction mixture was held at 125 degrees centigrade for one hour in order to permit the mixture to reach equilibrium. The liberated phenol was removed by distillation under reduced pressure of five millimeters of mercury and at a pot temperature of 185 degrees centigrade. During a five hour period a total of 2,115 parts of phenol were recovered.

The residue remaining in the resin flask (phenolphite) is a viscous liquid at 125 degrees centigrade and at that stage was poured from the resin flask into a wide mouth jar in a nitrogen atmosphere.

Upon cooling to room temperature it solidified to a hard brittle glassy solid that could be readily ground to a micro-fine white free flowing powder.

A total of 1,337 parts of phenolphite were obtained, representing essentially a one-hundred percent yield.

Example 2

This example illustrates the utility of phenolphite as a stabilizer in vinyl and vinylidene resins.

Phenolphite (0.25 part) prepared as set forth in Example 1 was stirred into 22.5 parts of di-2-ethylhexyl-phthalate. One part of barium cadmium laurate and 50 parts of polyvinyl chloride was then added and mixed in. Controls were made at the same time using the above reactants but excluding the phenolphite.

The above mixture was milled on a small rubber mill (rolls preheated to 300° F.) with a mixing time of about three minutes; and a milling time of about five minutes. A polyvinyl chloride film of about 45 mils thickness is produced.

The milled sheets were cut into ¾ inch by 1¼ inch rectangles, placed on a 6 x 6 inch glass plate, and the plates were placed in a 350° F. oven. These samples were heated as a means of accelerating ageing. Samples (plate by plate) were removed from the oven at fifteen minute intervals until there was a complete blackening of all the remaining samples. The cooled samples were then examined and visual comparisons of color development were made. The lack of color development is a measure of stabilizing efficiency.

A visual comparison of color development showed that the controls, containing no phosphite additives, were spotted after forty-five minutes and black thereafter. The phosphite treated samples were unspotted and unblackened after 195 minutes at 350° F. The phosphite treated samples also showed no signs of bubbling during this period of time while the controls did show signs of bubbling.

Example 3

Triphenyl phosphite (465 parts, 1.5 moles), pentaerythritol (123 parts, .9 mole), and 4,4'-dihydroxydiphenyl sulfide (98.1 parts, 0.45 mole) were reacted in the manner set forth in Example 1, using 0.1 part of sodium hydroxide per mole of triphenyl phosphite. A product was recovered which was a hard clear friable glass, soluble in acetone and benzene and insoluble in methanol.

This product has been given the coined name phenolphite-S and on elemental analysis found to have 5.5% sulfur. It had a melting point of 75–85 degrees centigrade.

Example 4

Utilizing the procedure set forth in Example 1, triphenyl phosphite (465 parts, 1.5 moles), pentaerythritol (123 parts, 0.9 mole) and a white product of a phenolic formaldehyde condensation, which was an acid catalyzed phenol-formaldehyde resin containing three phenolic radicals and two formaldehyde radicals connecting the phenolic radicals (94 parts, 0.9 mole), and sodium hydride (.15 part or 0.1 part per mole of triphenylphosphite) were charged in a one liter resin pot. The pot was gently heated to about between sixty and seventy degrees centigrade. The phenol was stripped, when a melt was formed, at a temperature of from about 84° to 85° centigrade, at a pressure of twenty millimeters absolute. The pot was then heated to about one hundred and eighty-five degrees centigrade under pressure of about five millimeters to remove the last traces of the phenol by-product.

After all the phenol by-product was stripped, the pot was allowed to cool to about 110 degrees centigrade and the reaction product was poured into a vessel where it was allowed to solidify. 258.5 parts of the product were recovered, which analysis showed had a phosphorus content of between 16.91 percent to 16.94 percent. Its decomposition point was over 300 degrees centigrade.

Example 5

Following the procedure of Example 1, 250 parts of tributyl phosphite (1 mole), 0.5 part of sodium, 115 parts of 4,4'-isopropylidenediphenol (0.5 mole) and 90 parts of trimethylol propane (⅔ mole) were reacted. 218.5 parts of the residue were obtained. Analysis of this residue indicated it had a phosphorus content of 10.4 percent.

The foregoing detailed description is illustrative of the invention and should be understood not to limit the invention in its broadest aspects, inasmuch as modifications of the invention and substitution of equivalents therein will be obvious to those skilled in the art.

We claim:

1. A phenolic phosphite obtained by reacting a triorganophosphite selected from the group consisting of triaryl phosphite, trihaloaryl phosphite and trialkylaryl phosphite of 18 to 66 carbon atoms and trialkyl phosphite of 3 to 48 carbon atoms, a polyol selected from the group consisting of hydroxy compounds of 2 to 18 carbon atoms and having at least 2 hydroxy groups and a phenolic compound having between two and three phenolic hydroxyl groups at a temperature between 60° and 180° C., said reactants being present in a reaction zone in proportions of from eight to twelve moles triorgano phosphite, four to six moles polyol, and one and a half to four moles phenolic compound, with the ratio of polyol to phenolic compound being from 1.5:1 to 2.5:1; stripping off the by-products formed by said reactants and recovering the phenolic phosphite.

2. The product of claim 1 wherein the triorganophosphite is triphenyl phosphite.

3. The product of claim 1 wherein the polyol is pentaerythritol.

4. The product of claim 1 wherein the phenolic compound is 4,4'-isopropylidenediphenol.

5. The product of claim 1 wherein the triorganophosphite, polyol and phenolic compound are respectively, triphenyl phosphite, pentaerythritol, and 4,4'-isopropylidenediphenol.

6. The product of claim 1 wherein the triorganophosphite, polyol and phenolic compound are respectively, triphenyl phosphite, pentaerythritol, and 4,4'-dihydroxydiphenyl sulfide.

7. A phenolic phosphite obtained by reacting triphenol phosphite, pentaerythritol, and a phenol-formaldehyde condensate having from 2 to 3 phenolic residues at a temperature between 60 degrees centigrade and 180 degrees centigrade, said reactants being present in a reaction zone in proportions of from eight to twelve moles triphenyl phosphite, four to six moles pentaerythritol, and one and a half to four moles of the phenol-formaldehyde condensate having from 2 to 3 phenolic residues, with the ratio of pentaerythritol to said phenol-formaldehyde condensate being from 1.5:1 to 2.5:1; stripping off the by-products formed by said reactants and recovering the phenolic phosphite.

8. A phenolic phosphite obtained by reacting tributyl phosphite, trimethylol propane, and 4,4'-isopropylidenediphenol at a temperature between 60 degrees centigrade and 180 degrees centigrade, said reactants being present in a reaction zone in proportions of from eight to twelve moles tributyl phosphite, four to six moles trimethylol propane, and one and a half to four moles of 4,4'-isopropylidenediphenol, with the ratio of trimethylol propane to 4,4'-isopropylidenediphenol being from 1.5:1 to 2.5:1; stripping off the by-products formed by said reactants and recovering the phenolic phosphite.

9. A compound which is a white crystalline solid having
  (a) an empirical formula $(C_{75}H_{90}O_{30}P_{10})_x$, wherein $x$ is an integer from 1 to 10,
  (b) a melting point of 93–96 degrees centigrade as ascertained by an electro-mercury melting point technique, (c) a refractive index, $n_D^{100°}$ C., equal to 1.558.

References Cited by the Examiner
UNITED STATES PATENTS

| | | | |
|---|---|---|---|
| 2,728,789 | 12/1955 | Morris et al. | 260—461 |
| 3,014,951 | 12/1961 | Birum | 260—461 |
| 3,053,878 | 9/1962 | Friedmann et al. | 260—461 |
| 3,061,586 | 10/1962 | Thompson | 260—45.95 |
| 3,082,187 | 3/1963 | Fuchsman et al. | 260—45.95 |
| 3,091,598 | 5/1963 | Joyner et al. | 260—45.95 |
| 3,139,450 | 6/1964 | Friendman | 260—461 |

CHARLES B. PARKER, *Primary Examiner.*

LEON J. BERCOVITZ, *Examiner.*

F. McKELVEY, R. RAYMOND, *Assistant Examiners.*

UNITED STATES PATENT OFFICE
CERTIFICATE OF CORRECTION

Patent No. 3,305,608　　　　　　　　　　　　　　February 21, 1967

Charles F. Baranauckas et al.

It is hereby certified that error appears in the above numbered patent requiring correction and that the said Letters Patent should read as corrected below.

Column 4, line 8, for "base" read -- phase --.

Signed and sealed this 28th day of November 1967.

(SEAL)
Attest:

Edward M. Fletcher, Jr.
Attesting Officer

EDWARD J. BRENNER
Commissioner of Patents